(12) United States Patent
Davis

(10) Patent No.: US 9,380,866 B1
(45) Date of Patent: Jul. 5, 2016

(54) TELESCOPIC SUPPORT

(71) Applicant: Bradford L. Davis, Holland, MI (US)

(72) Inventor: Bradford L. Davis, Holland, MI (US)

( * ) Notice: Subject to any disclaimer, the term of this patent is extended or adjusted under 35 U.S.C. 154(b) by 0 days.

(21) Appl. No.: 14/619,892

(22) Filed: Feb. 11, 2015

(51) Int. Cl.
*A47B 9/20* (2006.01)
*F16M 11/26* (2006.01)
*A47B 23/04* (2006.01)

(52) U.S. Cl.
CPC .............. *A47B 9/20* (2013.01); *A47B 23/046* (2013.01); *F16M 11/26* (2013.01)

(58) Field of Classification Search
CPC ........ A47B 9/20; A47B 23/046; F16M 11/26; F16M 11/32
USPC ................. 108/147.19, 148, 144.11, 106; 248/188.5, 188.2, 157
See application file for complete search history.

(56) References Cited

U.S. PATENT DOCUMENTS

| | | | | | |
|---|---|---|---|---|---|
| 2,806,722 | A * | 9/1957 | Atkins | ................... | E04H 12/182 248/413 |
| 2,835,520 | A | 5/1958 | Schiring et al. | | |
| RE24,982 | E | 5/1961 | Schiring et al. | | |
| 3,162,150 | A * | 12/1964 | Armstrong | ........... | A47B 23/046 108/106 |
| 3,521,341 | A * | 7/1970 | Hornlein | ................... | A47B 9/20 248/161 |
| 3,543,282 | A * | 11/1970 | Sautereau | ............... | A47B 27/14 108/141 |
| 3,887,247 | A | 6/1975 | Graae et al. | | |
| 3,888,444 | A * | 6/1975 | Yindra | .................... | A47B 27/00 248/188.5 |
| 3,905,311 | A * | 9/1975 | Carpentier | ........... | A47B 23/046 108/136 |
| 3,950,040 | A | 4/1976 | Fall | | |
| 3,986,697 | A | 10/1976 | Amor, Jr. et al. | | |
| 4,195,578 | A * | 4/1980 | Benoit | ................... | A47B 9/083 108/146 |
| 4,381,095 | A * | 4/1983 | Kritske | .................... | A47B 9/20 108/147.19 |
| 4,826,128 | A * | 5/1989 | Schmeller | ................ | B23Q 1/40 248/581 |
| 5,285,733 | A * | 2/1994 | Waibel | ..................... | A47B 9/20 108/147.19 |
| 5,370,063 | A * | 12/1994 | Childers | .................. | A47B 9/06 108/143 |
| 5,408,940 | A * | 4/1995 | Winchell | .................. | A47B 9/06 108/10 |
| 5,553,550 | A * | 9/1996 | Doyle | ...................... | A47B 9/00 108/147 |
| 6,595,144 | B1 * | 7/2003 | Doyle | ..................... | A47B 9/00 108/147 |
| 6,615,744 | B1 | 9/2003 | Eckstein et al. | | |
| 7,497,014 | B2 | 3/2009 | Muller | | |
| 7,658,359 | B2 * | 2/2010 | Jones | ....................... | A47B 9/00 108/147 |
| 8,001,909 | B2 * | 8/2011 | Overgaard | ............... | A47B 9/06 108/147 |
| D654,294 | S | 2/2012 | Davis | | |
| 8,700,218 | B2 * | 4/2014 | Crowell | .................... | B66F 7/16 414/785 |
| 8,925,154 | B2 * | 1/2015 | Ergun | ..................... | H01H 85/24 16/342 |
| 9,204,715 | B2 * | 12/2015 | Bonuccelli | ............... | A47B 9/20 |
| 2002/0050112 | A1 * | 5/2002 | Koch | ....................... | A47B 9/20 52/651.07 |
| 2002/0113176 | A1 * | 8/2002 | Frank | ...................... | F16B 12/44 248/125.8 |
| 2003/0033963 | A1 * | 2/2003 | Doyle | ...................... | A47B 9/04 108/147.19 |
| 2005/0002591 | A1 | 1/2005 | Buitmann | | |
| 2005/0066861 | A1 * | 3/2005 | DeBraal | ................... | A47B 9/00 108/147 |
| 2008/0121150 | A1 | 5/2008 | Picchio | | |
| 2009/0266274 | A1 * | 10/2009 | Berlin | .................. | A47B 23/046 108/6 |
| 2011/0175506 | A1 | 7/2011 | Davis | | |
| 2011/0197796 | A1 * | 8/2011 | Bhave | ................. | A47B 23/046 108/147.19 |
| 2013/0293173 | A1 * | 11/2013 | Strothmann | .............. | H02P 3/06 318/466 |

\* cited by examiner

*Primary Examiner* — Jose V Chen

(74) *Attorney, Agent, or Firm* — Warner Norcross and Judd LLP

(57) ABSTRACT

A telescopic support having an outer support tube and an inner support that move with respect to each other along a longitudinal axis of the telescopic support. At least three bearing sets having roller bearings are affixed to one of the outer support tube or the inner support. The roller bearings of a bearing set may be spaced apart along the longitudinal axis, and may be configured such that a rotational axis of each of the roller bearings is substantially directed toward the longitudinal axis of the telescopic support.

20 Claims, 12 Drawing Sheets

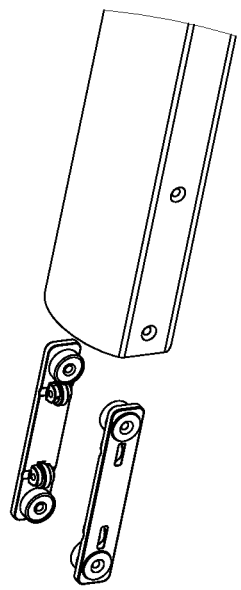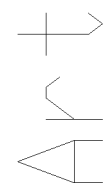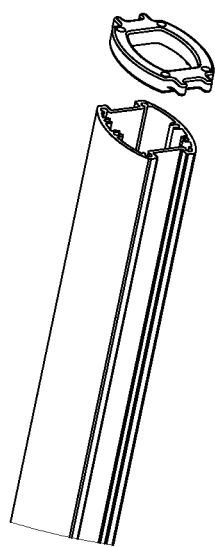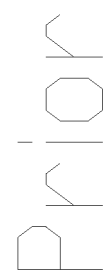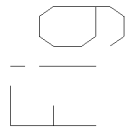
Fig. 1 Prior Art

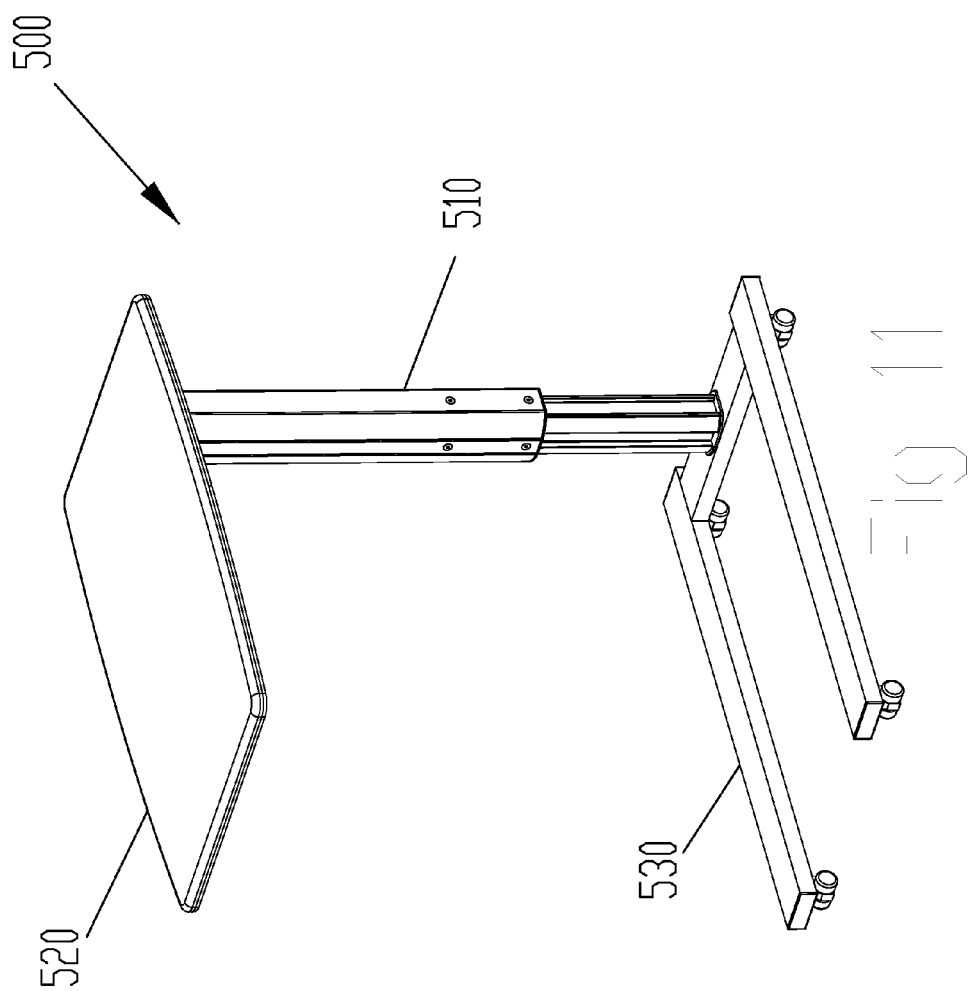

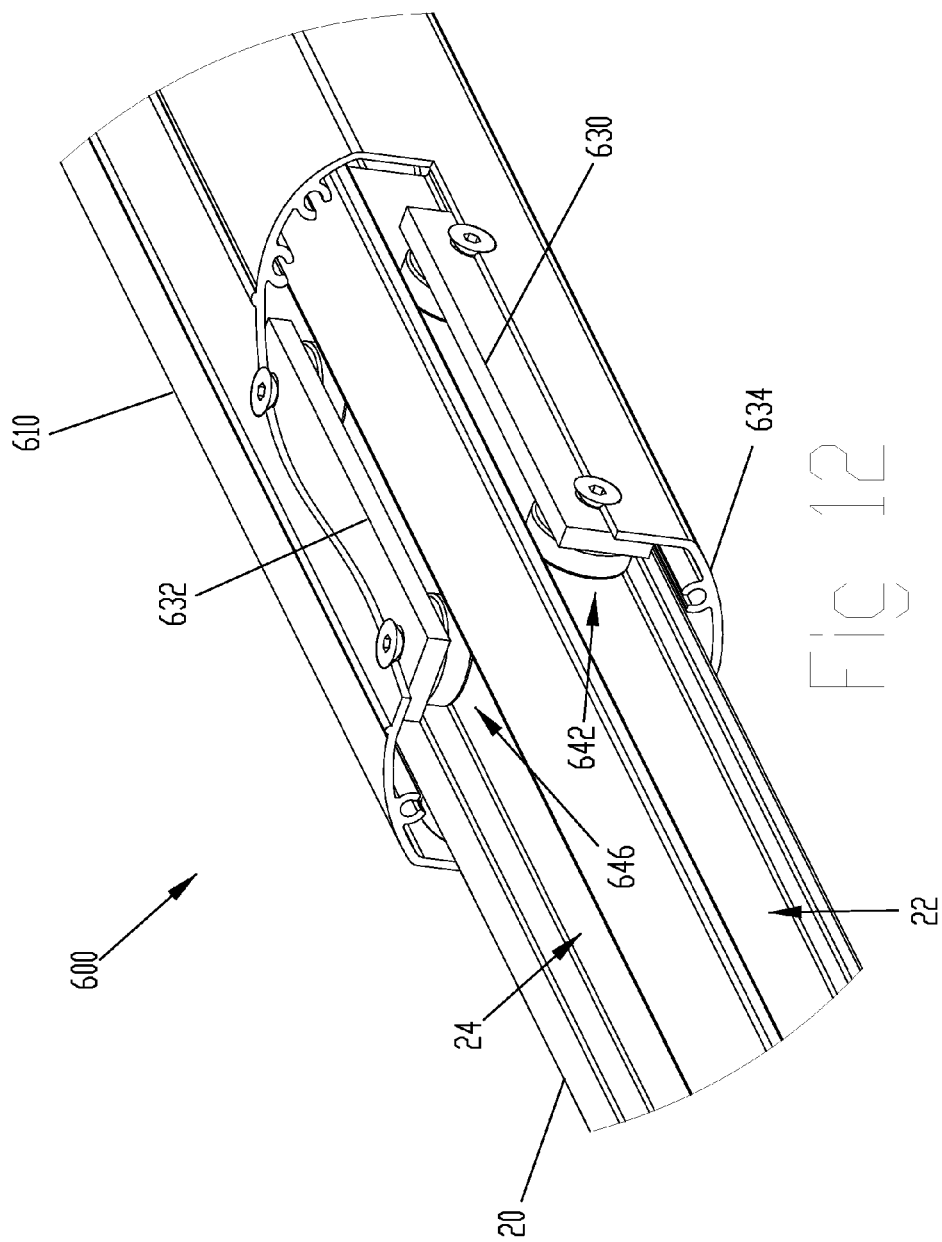

TELESCOPIC SUPPORT

TECHNICAL FIELD

The present invention relates to telescopic supports, and more particularly to telescopic supports having roller bearings.

BACKGROUND

Telescopic supports are used in a wide range of applications, including applications related to table and desk supports. In these applications, the telescopic support is often times disposed between a base and a tabletop to enable vertical adjustment of the tabletop. This conventional adjustable height table can be found in a variety of configurations and settings, such as in overbed tables for use in hospitals.

Conventional telescopic supports, in some cases, utilize an inner tube, an outer tube, and bearings therebetween. In this conventional configuration, the bearings are disposed to try to maintain axial alignment of the inner and outer tubes while allowing vertical movement of the tubes with respect to each other. The bearings also are disposed in a fixed relationship to one of the inner or outer tubes, and ride on a race disposed on or forming a part of the other of the inner or outer tubes. The race is aligned with the central or longitudinal axis of the support tubes. The primary purpose of this conventional configuration is to allow the telescopic support to extend and retract. However, as the telescopic support extends, the conventional bearing configuration often times loses its ability to maintain axial alignment under bending, torsional, or axial loads, or a combination thereof. If axial alignment is not maintained, the telescopic support may seem to tip or wobble, either of which can be unpleasant in the context of a tabletop.

An example construction of a conventional telescopic support is depicted in FIG. 1. As can be seen, the telescopic support includes a generally four sided inner tube and a generally four sided outer tube. Both tubes are formed of extruded aluminum. There are only two sets of bearings: one set of bearings is fixed to one side of the outer tube, and another set of bearings is fixed to the other side of the outer tube. Each of the two bearing sets includes four roller bearings, two bearings disposed with their rotational axis directed substantially away from the longitudinal axis of the conventional support, and the other two roller bearings disposed with their rotational axis directed substantially toward the longitudinal axis of the conventional support. Due to tolerance variations inherent to the aluminum extrusion process, the distance between the bearings and associated race surfaces can vary from one part to another. These variations can affect the ability to consistently manufacture a telescopic support that maintains axial alignment under various loads, and can result in significant wobble.

Conventionally, in an attempt to maintain axial alignment and counter the tolerance variations inherent to the aluminum extrusion process, one or more mounting or spacer blocks for each bearing set have been individually sized and machined to achieve a target clearance between the inner tube and the bearings. Incorporating such a machined spacer into the support, with dimensions specific to the support, provides a way to control the clearance between (a) the inner tube and (b) the two roller bearings of each set that have their rotational axis directed substantially away from the longitudinal axis of the support. Because these bearings are on opposite sides of the inner tube, reducing the clearance with the machined spacer can yield a fair degree of stability in axial alignment despite different loading conditions. However, it should not go unnoticed that this manufacturing process involves producing a machined part specific to the dimensions of each piece of extruded aluminum in the support. This process of measuring, machining and fitting a non-standard spacer for each support can be laborious and expensive. In other words, machining and fitting a non-standard spacer specific to the dimensions of each support can add significant cost to the support. Additionally, attempts to repair such a support can be impeded because non-standard parts can be laborious and costly to replace.

SUMMARY OF THE DESCRIPTION

The present disclosure is directed to a telescopic support having an outer support tube and an inner support that move with respect to each other enabling the telescopic support to extend and retract. The outer support tube includes an interior wall that extends along a longitudinal axis of the telescopic support. The interior wall defines an interior space through which the inner support is capable of moving in a direction parallel to the longitudinal axis of the telescopic support. At least three bearing sets may be affixed to one of the outer support tube or the inner support. Each bearing set may include at least two roller bearings spaced apart along the longitudinal axis, and where a rotational axis of each of the roller bearings is substantially directed to the longitudinal axis of the telescopic support. The other of the outer support tube or the inner support tube may include at least two race surfaces associated with each bearing set. The at least two race surfaces may be substantially parallel to the longitudinal axis of the telescopic support, and may define respective planes substantially parallel to the rotational axis of the roller bearings of the associated bearing set.

In one embodiment, the outer support tube may include an upper outer end opposite a lower outer end with the interior wall extending along the longitudinal axis between the upper outer end and the lower outer end. The inner support includes an upper inner end opposite a lower inner end with a sidewall extending along the longitudinal axis between the upper inner end and the lower inner end. With the telescopic support in a fully retracted position, the upper inner end of the inner support and the upper outer end of the outer support tube may be in general proximity to each other. With the telescopic support in a fully extended position, the upper inner end of the inner support may be in general proximity to the lower outer end of the outer support tube.

In one embodiment, each of the bearing sets may be affixed to and disposed in proximity to the lower outer end of the outer support tube. The telescopic support may further include a guide plate affixed to the upper inner end of the inner support. As the telescopic support extends and retracts, the guide plate may interface with the interior wall of the outer support tube, thereby further stabilizing the telescopic support and aiding in avoiding wobble or tip.

In one embodiment, the at least two race surfaces associated with each of the at least three bearing sets define a race set that may be disposed on or formed by a channel in the sidewall of the inner support. As an example, there may be three bearing sets and three associated race sets. Two of the race sets may be positioned on opposite sides of the sidewall of the inner support, and the third race set may be positioned on a portion of the sidewall between the other two oppositely positioned race sets. The oppositely positioned race sets and the associated bearing sets in this embodiment may substantially stabilize the telescopic support with respect to forces perpendicular to a line defined between the oppositely positioned race sets. The third race set may substantially stabilize the telescopic support with respect to forces applied parallel to this line.

In one embodiment according to the present invention, a telescopic support is provided with at least three bearing sets, each having at least two roller bearings disposed with a rotational axis directed substantially toward a longitudinal axis of the telescopic support. The telescopic support may further include a guide plate that slides within the telescopic support and aids in stabilizing the telescopic support as it extends and retracts. The telescopic support may provide enhanced stability to substantially avoid misalignment between inner and outer supports of the telescopic support. In this way, applications in which the telescopic support is used, such as in an overbed table, may be less prone to wobble or tipping.

These and other objects, advantages, and features of the invention will be more fully understood and appreciated by reference to the description of the current embodiments and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 1 is a prior art embodiment.

FIG. 11 is a perspective view of a telescopic support according to one embodiment.

FIG. 12 is an enlarged cutaway view showing part a telescopic support according to an alternative embodiment.

DETAILED DESCRIPTION

Figure 2:
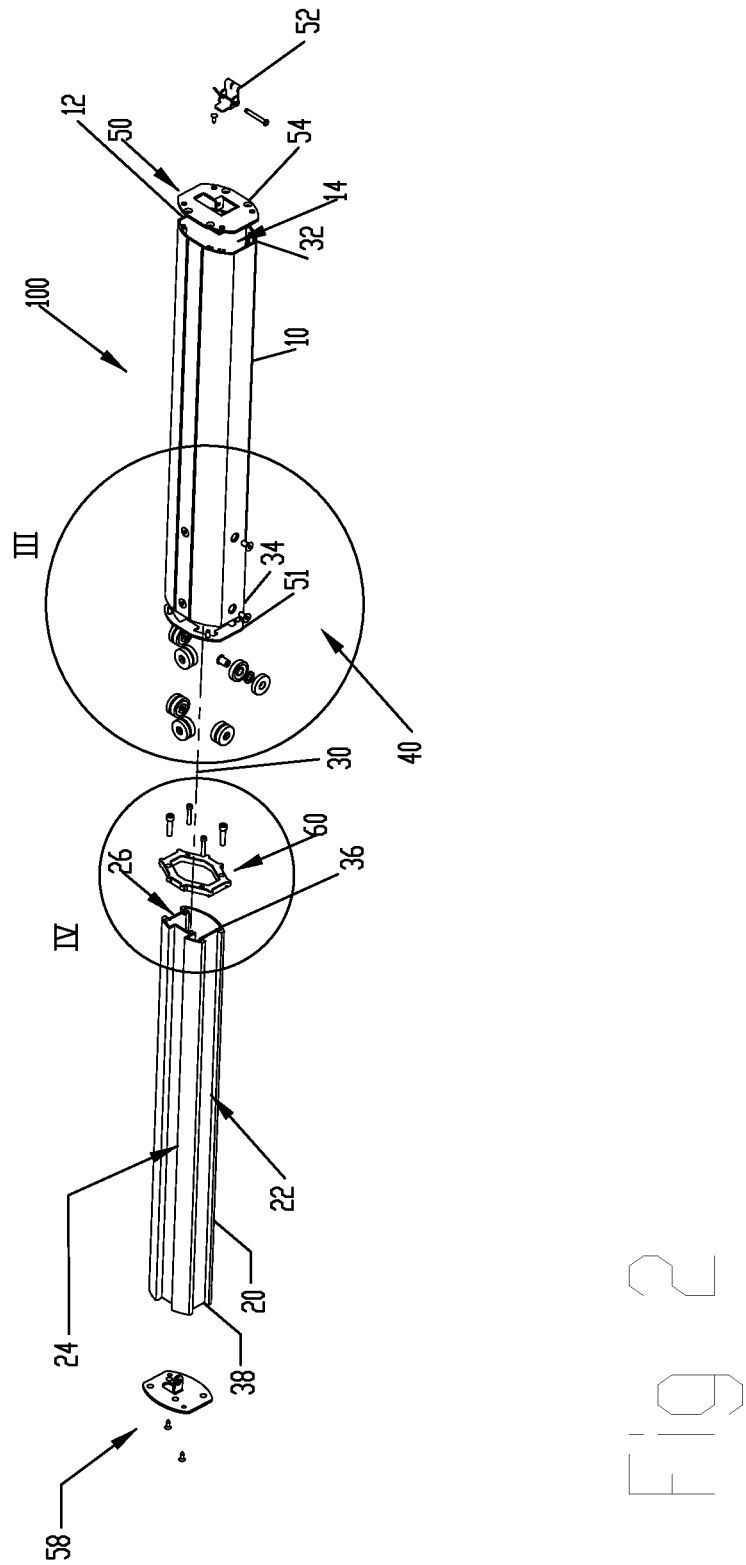
FIG. 2 is an exploded view of a telescopic support according to one embodiment.

A telescopic support in accordance with one or more embodiments of the present invention is shown in FIG. 2, and generally designated 100. As set forth below, the telescopic support 100 may include an outer support tube 10 and an inner support 20, the outer support tube 10 and the inner support 20 being capable of moving with respect to each other such that the telescopic support 100 can extend and retract. The inner support 20 may be received within an interior space 14 of the outer support tube 10 defined by an interior wall 12 of the outer support tube 10. In particular, the inner support 20 may be movable in a direction substantially parallel to a longitudinal axis 30 shared and defined by the inner support 20 and the outer support tube 10. A substantial portion of the inner support 20 may be movably received within the interior space 14 such that the telescopic support 100 may be substantially retracted. Conversely, the inner support 20 may be movably extended out from the interior space 14 such that the telescopic support 100 may be substantially extended.

The inner support 20 in the illustrated embodiment is formed of a hollow tube similar to the outer support tube 10. However, it is not necessary for the inner support 20 to be hollow—the inner support may be solid or have a support matrix (e.g., foam or a honeycomb matrix) disposed within. The outer support tube 10 and the inner support 20 may be aluminum manufactured through an extrusion process. Alternative materials may be used to form the outer support tube 10 and the inner support 20, including, for example, plastic. Although the outer support tube 10 and the inner support 20 are depicted in the illustrated embodiment as generally rectangular cylinders, it should be understood that the present invention is not so limited, and that the outer support tube 10 and the inner support tube 20 may be formed of any type of cylinder. It should further be understood that, although the cross-sections of the outer support tube 10 and inner support 20 are generally uniform in the illustrated embodiment, one or both of these cross-sections may vary depending on the application.

In the illustrated embodiment of FIG. 2, the telescopic support 100 includes a bearing package 40 having a plurality of bearing sets respectively capable of riding on or disposed to interface with a race set. The bearing package 40, or a portion thereof, may be mounted to at least one of the outer support tube 10 and the inner support 20, and one or more race sets may be disposed on the other of the outer support tube 10 and the inner support 20 to interface with a respective bearing set of the bearing package 40.

In the illustrated embodiment, the bearing package 40 may include a plurality of race sets 22, 24, 26 disposed on the interior wall 12 of the outer support tube 10, and the inner support 20 may include a plurality of race sets 22, 24, 26 configured to interface with a respective race set from among the plurality of race sets 22, 24, 26. The bearing package 40 in the illustrated embodiment includes at least one pair of opposing bearing sets 42A-B, 44A-B and at least one intermediate bearing set 46A-B disposed in the space between the at least one pair of opposing bearing sets 42A-B, 44A-B. The at least one pair of opposing bearing sets 42A-B, 44A-B may be coupled to opposing sides of the interior wall 12, and the at least one intermediate bearing set 46A-B may be coupled to a portion of the interior wall 12 located between the two opposing sides to which the opposing bearing sets 42A-B, 44A-B are coupled. In the illustrated embodiment, the bearing set 42A-B includes two bearing members 42A, 42B that are separate from each other. However, it should be understood that the present disclosure is not so limited, and that the bearing set 42A-B may include fewer or greater numbers of bearing members 42A, 42B. Alternatively or additionally, one or more of the bearing members 42A, 42B may form an integrated bearing member by being connected via another component, such as the spacer 630 depicted in the illustrated embodiment of FIG. 12. The other bearing sets 44A-B, 46A-B in the illustrated embodiment of FIG. 3 may be configured in a variety of ways similar to the bearing set 42A-B.

Figure 3:
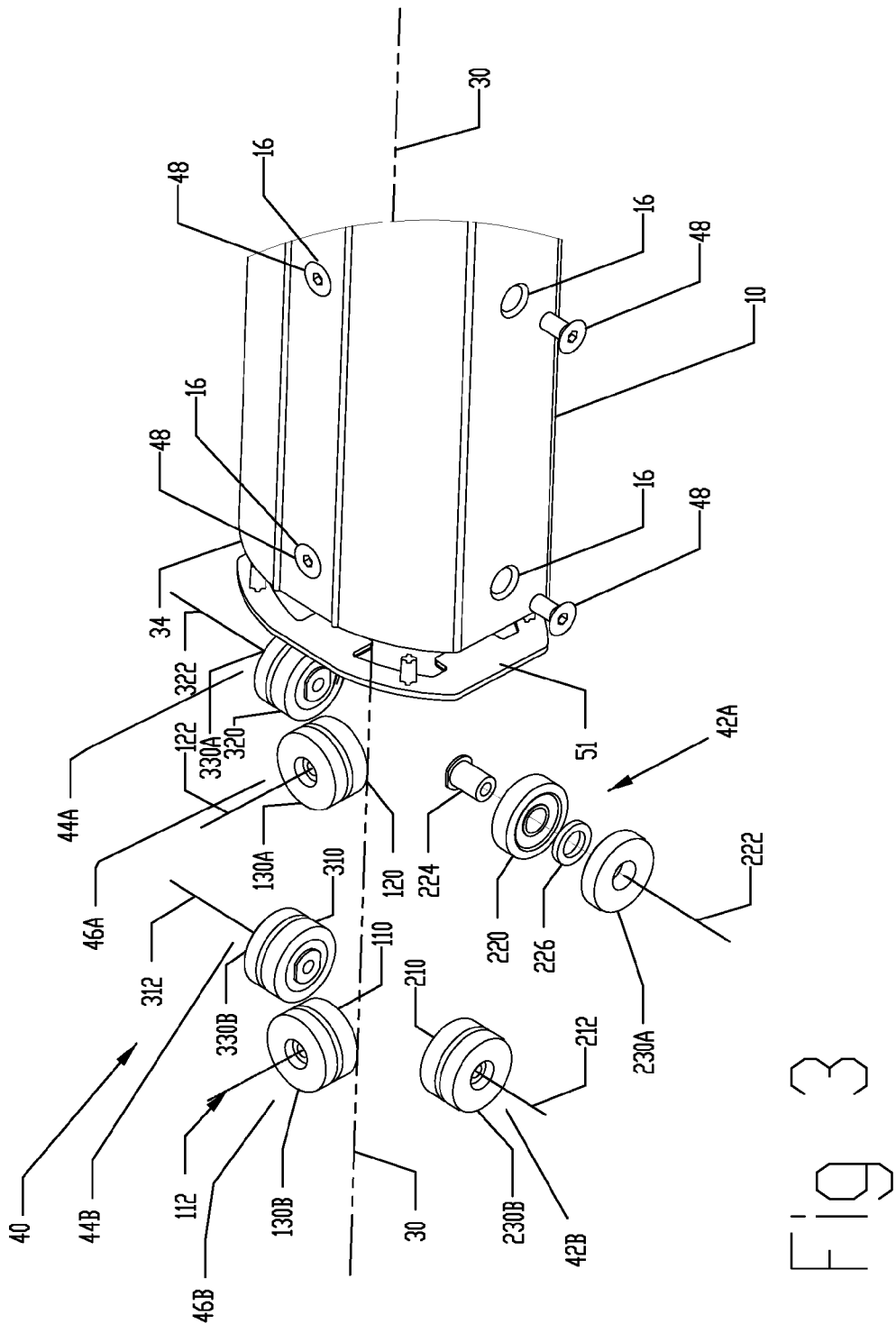
FIG. 3 is a partial enlarged view of the telescopic support in FIG. 2.
Figure 5:
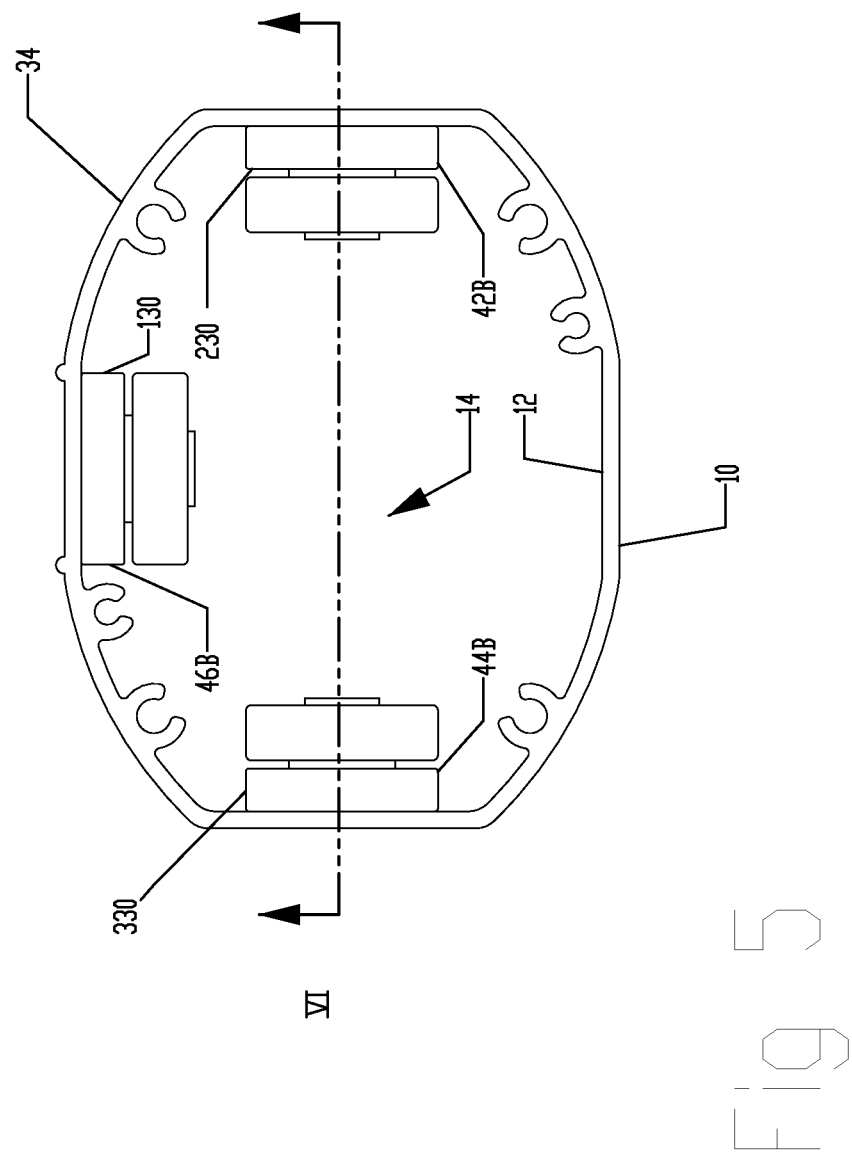
FIG. 5 is a bottom view of an outer support tube for a telescopic support according to one embodiment.
Figure 6:
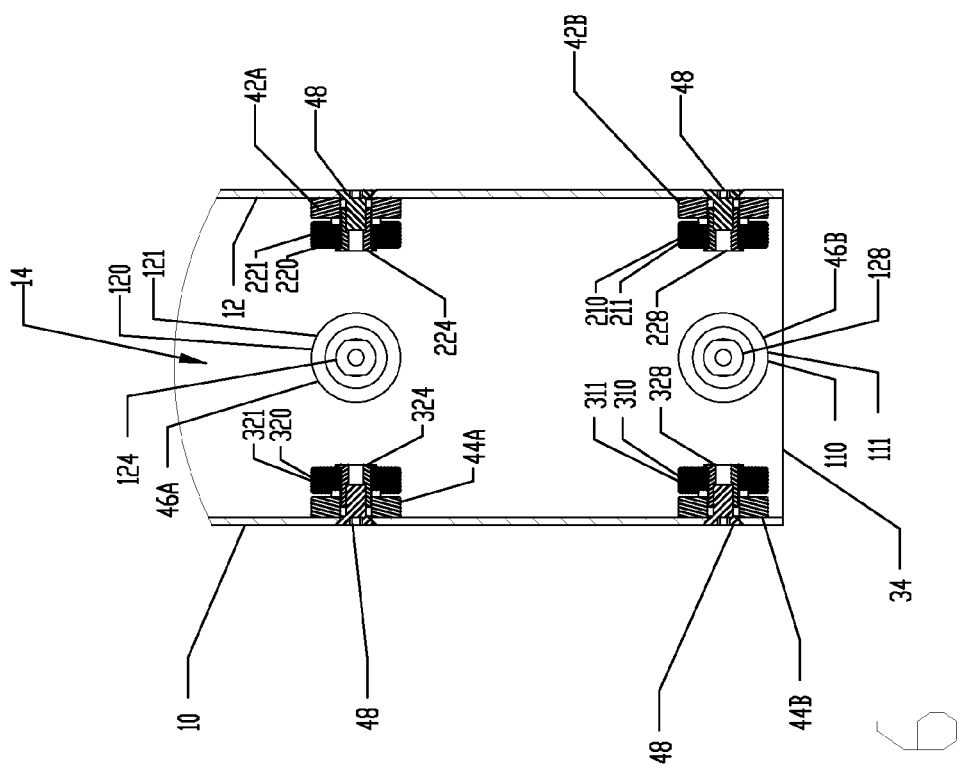
FIG. 6 is a sectional view of the outer support depicted in FIG. 5.

The bearing package 40 according to one embodiment is depicted in further detail in the illustrated embodiments of FIGS. 3, 5 and 6. Each of the plurality of bearing sets 42A-B, 44A-B, 46A-B in this embodiment may include at least two roller bearings and respective spacer plates. More specifically, in the illustrated embodiment, the intermediate bearing set 46A-B located between the two opposing bearing sets 42A-B, 44A-B may include respective spacer plates 130A-B, an upper roller bearing 110, and a lower roller bearing 120. Likewise, the bearing set 42A-B may include respective spacer plates 230A-B, an upper roller bearing 210, and a lower roller bearing 220, and the bearing set 44A-B may include respective spacer plates 330A-B, an upper roller bearing 310, and a lower roller bearing 320. The respective spacer plates 130A-B, 230A-B, 330A-B in the illustrated embodiment are generally circular, but may be shaped differently depending on the application, and aid in positioning the roller bearings of the bearing sets 42A-B, 44A-B, 46A-B to interface with the race sets of the inner support 10. The respective spacer plates 130A-B, 230A-B, 330A-B may be sized and configured to sufficiently clear the inner support 10 and the race sets thereof to substantially avoid interfering with operation of the bearing package 40.

The bearing sets 42A-B, 44A-B, 46A-B may be mounted to the interior wall 12 of the outer support tube 10 via screws 48, which may fit through apertures 16 of the outer support tube 10, and which may engage a bushing 124, 128, 224, 228, 324, 328 of the roller bearings 110, 120, 210, 220, 310, 320. The bushing 224 can be seen in the exploded view of the lower roller bearing 220 in FIG. 3, and in the sectional view of FIG. 6. The other roller bearings may include a similar bushing. The bushing 224 may fit within an aperture of the lower roller bearing 220, and within an aperture of respective spacer plate 230A in order to aid in maintaining the lower roller bearing 220 in a fixed position relative to the outer support tube 10. The bushing 224, itself, may include an aperture that engages the screw 48. The bushing 224 may also include a flange that interfaces with and captures an inner face of the lower roller bearing 220 such that the lower roller bearing 220 is capable of rotation about its rotational axis 222 while remaining in a fixed position relative to the outer support tube 10. The flange of the bushing 224 may also include flat sides to aid in holding the bushing 224 in place while fastening the screw 48 to the aperture of the bushing 224. The bushings 124, 128, 228, 324, 328 may be similar to or different from the bushing 224.

In the illustrated embodiment, the roller bearings 110, 120, 210, 220, 310, 320 may include respective rollers 111, 121, 211, 221, 311, 321. The rollers 111, 121, 211, 221, 311, 321 may be formed primarily of an outer shell (e.g., Delrin® or nylon) disposed over an inner bearing, but the present invention is not so limited. The rollers 111, 121, 211, 221, 311, 321 can be any type of material, and can be separately or integrally formed of more than one material. For example, the outer bearing surface of the rollers 111, 121, 211, 221, 311, 321 that interfaces with the races 22, 24, 26 of the inner support 20 may be formed of one material, and other portions may be formed of another material. Further, the outer bearing surface may be hardened or worked or machined, or a combination thereof, to provide enhanced durability and reliability.

In the illustrated embodiment, the lower roller bearing 220 may include a washer 226 configured to interface between the spacer plate 230A and the outer face of the lower roller bearing 220. It should be understood that the present invention is not limited to the specific roller bearing construction depicted and described in connection with the illustrated embodiment; in other words, the roller bearings may be configured differently. For example, one or more of the bushing 224, spacer plate 230A, and washer 226 may be absent. It should be further understood that the bearing package 40 may be provided as one or more separate components, individually installable at manufacture, or as one or more preassembled components installable at manufacture, or a combination thereof.

In the illustrated embodiment of FIG. 3, each of the roller bearings 110, 120, 210, 220, 310, 320 may rotate about a respective rotational axis 112, 122, 212, 222, 312, 322. For example, the upper roller bearing 110 of the bearing set 46A-B may rotate about the rotational axis 112, and the lower roller bearing 120 of the bearing set 46A-B may rotate about the rotational axis 122. In one embodiment, the rotational axes 112, 122, 212, 222, 312, 322 of the roller bearings 110, 120, 210, 220, 310, 320 are directed substantially toward the longitudinal axis 30 of the telescopic support 100. For example, with this configuration, the inner faces of the roller bearings 110, 120, 210, 220, 310, 320 may face toward the longitudinal axis 30, while the outer faces of the roller bearings 110, 120, 210, 220, 310, 320 may face away from the longitudinal axis 30. As another example, with the rotational axes 112, 122, 212, 222, 312, 322 directed substantially toward the longitudinal axis 30, the bearing surface of the roller bearings 110, 120, 210, 220, 310, 320 may define a cylindrical, unbounded surface whose longitudinal axis (a) is substantially perpendicular to the longitudinal axis 30 of the outer support tube 10, and (b) intersects at least two points of the inner support 20 (e.g., similar to a secant line in the context of a circular, cylindrical inner support). In yet another example, the rotational axes of one or more of the roller bearings 110, 120, 210, 220, 310, 320 may intersect at least two points of the inner support 20 (e.g., similar to a secant line in the context of the a circular, cylindrical inner support) and intersect a diameter line defined by the inner support 20. As described herein, the inner support 20 and the outer support tube 10 may be non-circular cylinders. In this context, a diameter line may be considered to be a line defined by a sectional plane of the cylinder that is collinear with the longitudinal axis 30 of the cylinder, where the line is within the sectional plane and perpendicular to the longitudinal axis 30 of the cylinder.

Thus, in describing the rotational axes 112, 122, 212, 222, 312, 322 as being directed substantially toward the longitudinal axis 30, it should be understood that the present invention is not limited to embodiments in which the rotational axes 112, 122, 212, 222, 312, 322 actually intersect the longitudinal axis 30 of the telescopic support 100. Further, it should be understood that the orientation of a rotational axis for one roller bearing may be different from the orientation of a rotational axis for another roller bearing.

In one embodiment, the telescopic support 100 may include a finger guard 51 affixed to the lower end 34 of the outer support tube 10. The finger guard 51 may be configured to provide sufficient clearance for the inner support 20 to move into and out of the interior space 14, while substantially limiting entry of small objects into the interior space 14, including, for example, fingers and debris. For purposes of disclosure, the illustrated embodiment of FIG. 3 is shown partially exploded with the bearing package 40 positioned outside the interior space 14 of the outer support tube 10. The lower roller bearing 220 is also exploded to facilitate understanding. For these reasons, the finger guard 51 is shown between the bearing package 40 and the outer support tube 10. However, in an assembled state, the bearing package 40 may be disposed within the outer support tube 10, and the finger guard 51 may be disposed on the upper end 32 of the outer support tube 10.

For purposes of disclosure, the outer support tube 10 and the inner support 20 in the illustrated embodiment of FIG. 2 may be described as having respective upper and lower ends; however, it should be understood that this terminology is an expedient for understanding, and that the present invention is not limited to a particular end being an upper or lower end. In the illustrated embodiment, the outer support tube 10 may include an upper end 32 and a lower end 34, and the inner support 20 may include an upper end 36 and a lower end 38. With the telescopic support 100 in the fully retracted or collapsed position, the upper end 36 of the inner support 20 may be in proximity to the upper end 32 of the outer support tube 10 such that the inner support is substantially within the interior space 14 of the outer support tube 10. In the fully extended position, the upper end 36 of the inner support 20 may be in proximity to the lower end 34 of the outer support tube 10. In the illustrated embodiment, because the bearing package 40 is located near the lower end 34 of the outer support tube 10, and because the bearing package 40 interfaces with the inner support 20, the upper end 36 of the inner support 20 may be limited from extending toward close proximity to the lower end 34 of the outer support 10. For example, the upper end 36 of the inner support 20 may be limited from extending past an end of the bearing package 40 facing the upper end 32 of the outer support tube 10. In this way, the inner support 20 may extend from within the interior space 14 while maintaining an interface with the bearing package 40. In one embodiment, as described herein, a guide plate 60 may be affixed to the upper end 36 of the inner support 20. This guide plate 60 may engage the bearing package 40 at a stop point to substantially prevent the inner support 20 from further extension past the stop point.

In one embodiment, the telescopic support 100 may include a bottom washer 58 affixed to the lower end 38 of the inner support 20, and a top washer 50 affixed to the upper end 32 of the outer support tube 10. A gas cylinder (not shown) may be disposed along the longitudinal axis 30 of the telescopic support 100 within the interior space 14 and within an interior space defined within the inner support 20. The gas cylinder may be connected at respective ends to the bottom washer 58 and the top washer 50, and may assist in extending, retracting, and maintaining the position of the outer support tube 10 with respect to the inner support 20. The top washer 50 may include a top plate 54 and an actuator 52 capable of actuating the gas cylinder. For example, the actuator 52 may be pivoted by an operator to actuate a valve of the gas cylinder to enable extension or retraction of the outer support tube 10. The actuator 52 may be coupled to a spring that automatically returns the actuator 52 to a position at which the valve is not actuated, thereby substantially preventing actuation of the valve unless an operator pivots the actuator 52. After an operator has adjusted the height or extension of the telescopic support 100, the actuator 52 may be released such that the valve is inactive and the gas cylinder substantially maintains the current height or current length of the telescopic support 100. In the illustrated embodiment, the interior space of the telescopic support 100 may be sufficient to accept the gas cylinder along the longitudinal length of the telescopic support 100. For example, the cross sections of the inner support 20 and the outer support tube 10, the bearing package 40, and the guide plate 60 may be configured to provide clearance for the gas cylinder within the telescopic support 100.

Figure 4:
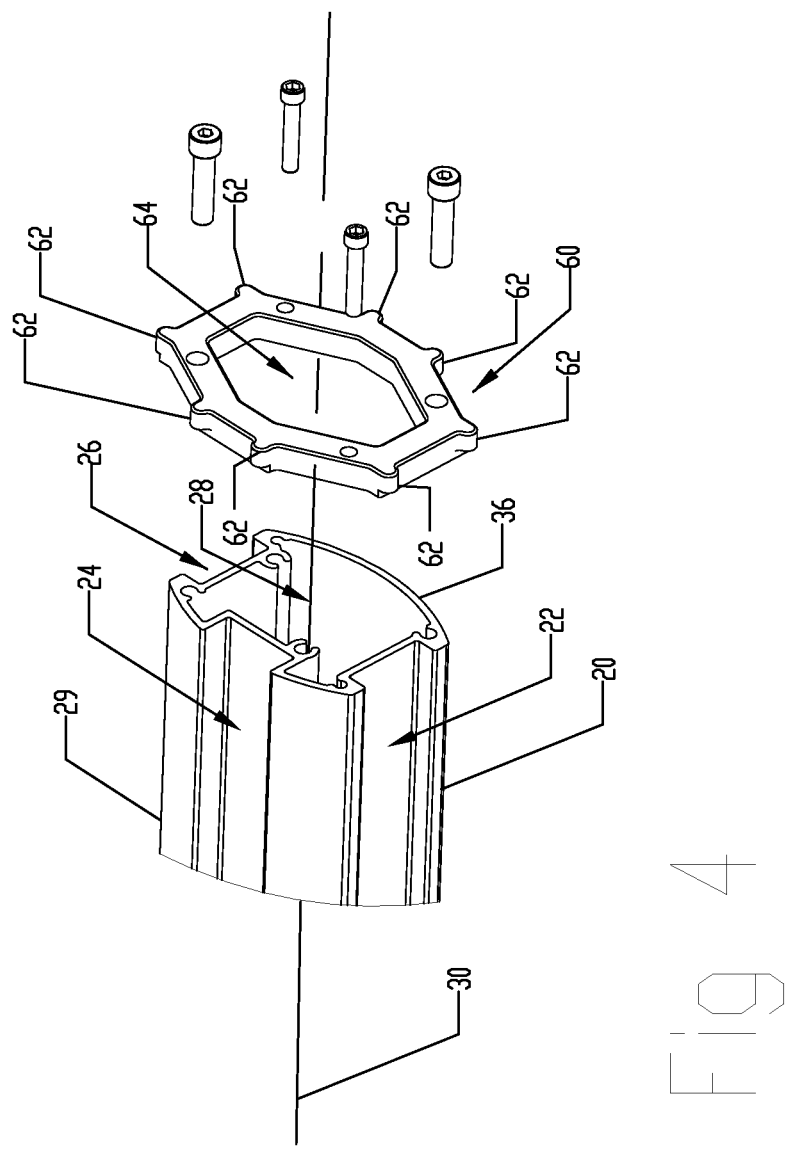
FIG. 4 is a partial enlarged view of the telescopic support in FIG. 2.
Figure 7:
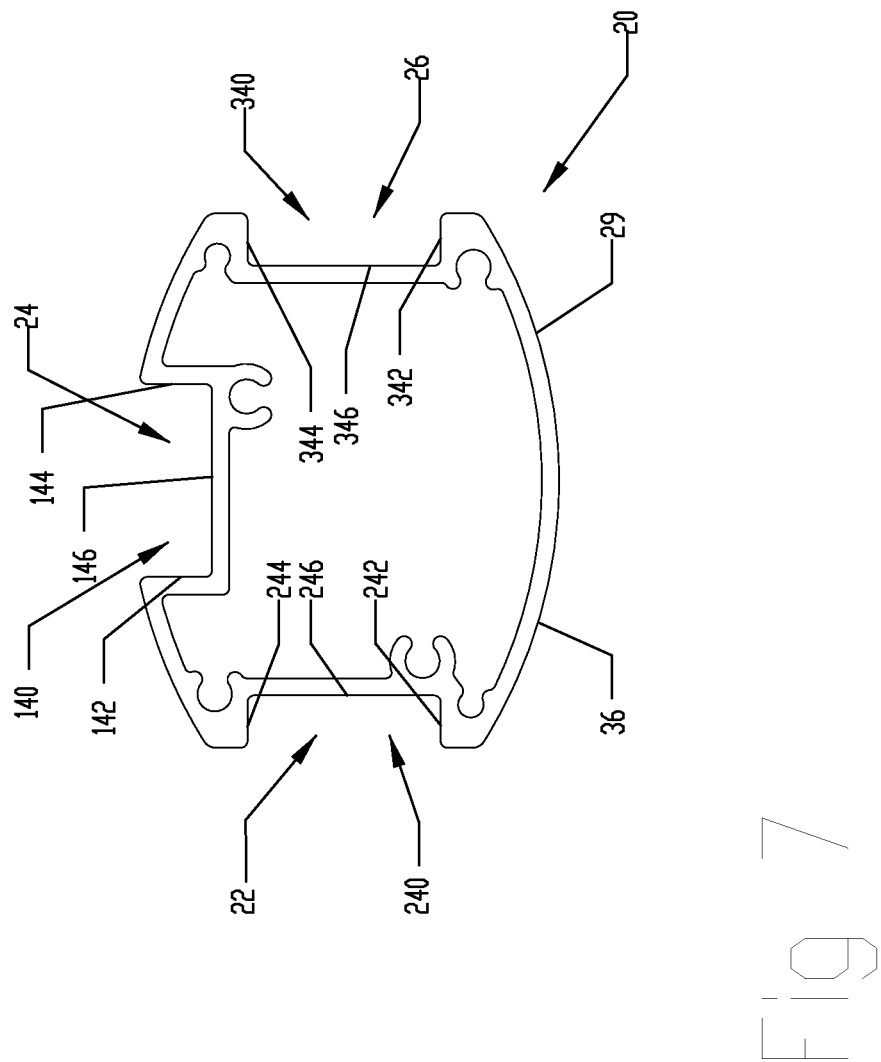
FIG. 7 is a top view of an inner support for a telescopic support according to one embodiment.
Figure 8:
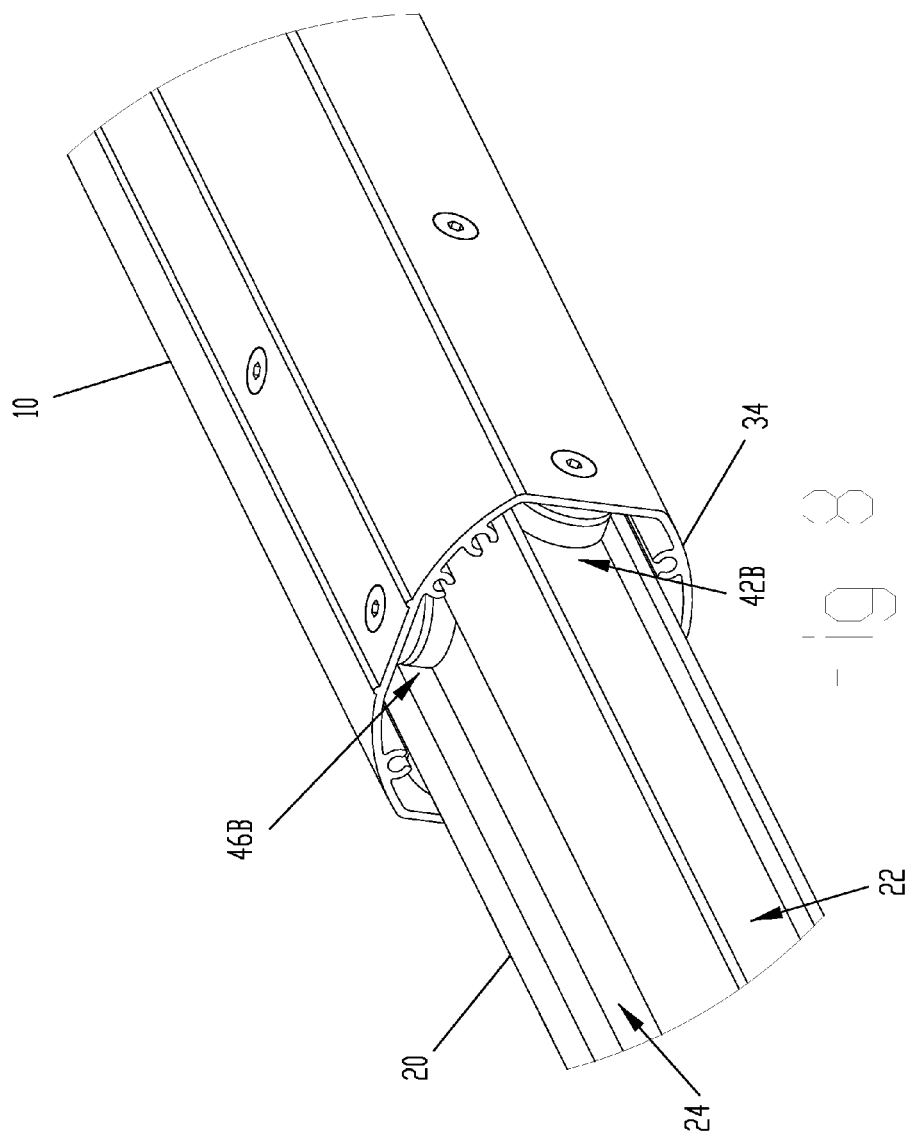
FIG. 8 is a perspective view of the telescopic support depicted in FIG. 2.

In the illustrated embodiments of FIGS. 2, 4 and 7, the inner support 20 may include a plurality of race sets 22, 24, 26. Each of the plurality of race sets 22, 24, 26 may extend along a substantial portion of the inner support 20, and cooperate with a respective bearing set 42A-B, 44A-B, 46A-B to aid in maintaining axial alignment of the telescopic support 100 despite various loading conditions and regardless of whether the inner support 20 is fully extended, fully retracted, or in a position therebetween. In the illustrated embodiment, the inner support 20 is a tubular structure defining an interior space 28. However, as mentioned herein, the inner support 20 is not so limited, and may be configured differently. The inner support 20 may include a plurality of race sets configured to interface with a respective bearing set of the bearing package 40. In the illustrated embodiment, the inner support 20 includes at least three race sets 22, 24, 26 defined by and integral to an outer wall 29 of the inner support 20. Two of the race sets 22, 26 may be disposed on opposing sides of the outer wall 29, and a third, intermediate race set 24 may be disposed on a side of the outer wall 29 between the two opposing sides.

Each of the at least three race sets 22, 24, 26 in the illustrated embodiment may be defined by respective race channels 140, 240, 340, which may be integral to the outer wall 29 of the inner support 20. The race channels 140, 240, 340 may receive the at least two roller bearings of the associated bearing sets 42A-B, 44A-B, 46A-B. The race channels 140, 240, 340, themselves, may include two laterally opposed race surfaces with a medial channel face therebetween. For example, in the context of the race channel 140 depicted in the illustrated embodiment, two opposing race surfaces 142, 144 with a medial channel face 146 therebetween may be defined by the outer wall 29 of the inner support 20. The medial channel face 146 may be configured to directly face the interior wall 12 of the outer support tube 10. In the illustrated embodiment, the medial channel faces 146, 246, 346 are approximately 1.1 inches wide, and extend along the length of the inner support 20. The race surfaces 142, 144, 242, 244, 342, 344 are disposed on lateral sides of the respective channel face 146, 246, 346, and perpendicular thereto. The width of the race surfaces 142, 144, 242, 244, 342, 344 in the illustrated embodiment may be between about 0.3 inches and 0.45 inches. It should be understood that the construction and dimensions may be different depending on the application.

In one embodiment, the race surfaces 142, 144, 242, 244, 342, 344 may be formed by machining the inner support 20 after it has been extruded. The race surfaces 142, 144, 242, 244, 342, 344 may be machined to provide a repeatable race width, or a substantially consistent race width from one inner support 20 to another. The tolerance in one embodiment may be +/−0.020; it should be understood that the tolerance may be greater or smaller depending on the application. In the manufacturing process, extruded parts can be formed with additional material sufficient to allow the machining process to achieve a target race width. For example, by extruding the inner support 20 with additional material along the race surfaces 142, 144, areas of the race surfaces 142, 144 may be prevented from avoiding a tool used in the machining process, thereby substantially preventing areas that form divots in the race surfaces 142, 144, 242, 244, 342, 344 or tolerance deviations in the race width.

By machining the race surfaces 142, 144, 242, 244, 342, 344 potential deformities may be substantially removed to enhance durability and operation of the telescopic support 100. All or a portion of the race surfaces 142, 144, 242, 244, 342, 344 may be machined along the length of the inner support 20. For example, in one embodiment, the bearing surface the roller bearings may not interface with the full width of the race surfaces 142, 144, 242, 244, 342, 344. In this example, a portion of the race surfaces 142, 144 less than the full width may be machined to interface with the roller bearings. The width of the machined portion may be about the same as or larger than the width of the roller bearings. Alternatively, the race surfaces 142, 144, 242, 244, 342, 344 may not be machined. The race surfaces 142, 144, 242, 244, 342, 344 may be used as is after the extrusion process.

To prepare the race surfaces 142, 144, 242, 244, 342, 344 for interaction with a roller bearing, a surface finish or treatment may be used. In the illustrated embodiment, the race surfaces 142, 144, 242, 244, 342, 344 may be anodized. The anodization process may harden the surface of the race surfaces to improve durability.

Figure 10:
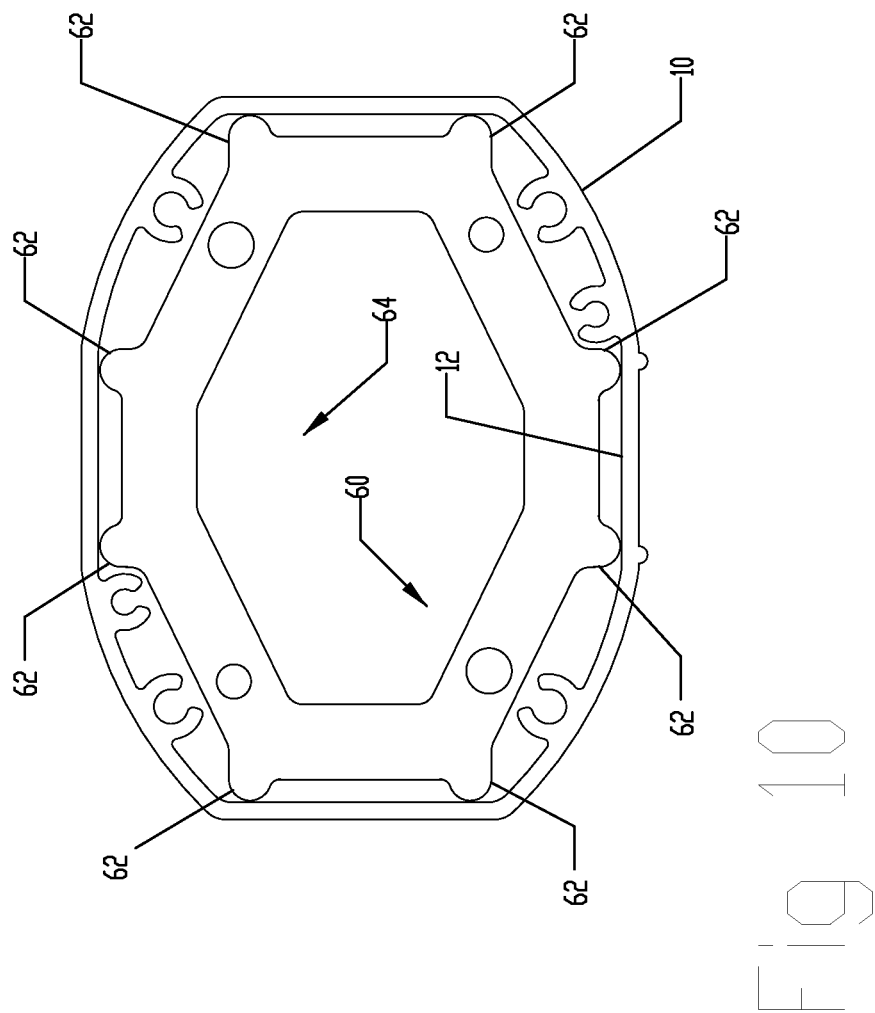
FIG. 10 is a top view of the telescopic support depicted in FIG. 2.

As depicted in the illustrated embodiments of FIGS. 2, 4 and 10, the telescopic support 100 may include a guide plate 60 affixed to the upper end 36 of the inner support 20. The guide plate 60 may include a plurality of apertures through which screws 48 may fit. The screws 48 may interact with screw bosses in the inner support 20 to hold the guide plate 60 in place on the upper end 36 of the inner support 20. The guide plate 60, as mentioned herein, may be sized to fit within the interior space 14 of the outer support tube 10, and may include a plurality of projections 62 spaced about the perimeter of the guide plate 60. The guide plate 60 also may include an aperture 64 sized to accept the gas cylinder (not shown).

In the illustrated embodiment, each side of the interior wall 12 of the outer support tube 10 may interface with two projections 62 of the guide plate 60. Because the interior wall 12 generally includes four sides, the guide plate 60 includes eight projections 62, two for each side of the interior wall 12. More or fewer projections 62 may be provided for each side of the interior wall 12. Additionally or alternatively, the guide plate 60 may include projections 62 disposed to interface with some but not all sides of the interior wall 12. The projections 62 are described as interfacing with a side of the interior wall 12 to facilitate understanding. It should be understood that the term side is not limited to sides being substantially flat, and may include any surface of the interior wall 12, regardless of its shape.

In one embodiment, the guide plate 60 may include a pair of projections 62 disposed in an opposing manner such that a first projection 62 on one side of the guide plate 60 is complemented by a second projection 62 on the other side. In this way, the first and second projections 62 may interact with the interior wall 12 of the outer support tube 10 to substantially prevent lateral movement between the inner support 20 and the outer support tube 10 along a line or vector defined by the opposing arrangement of the first and second projections 62. The guide plate 60 may include a plurality of opposing pairs of projections 62 that together may aid in preventing lateral movement of the inner support 20 near the upper end 36. For example, a first opposing pair of projections 62 may be disposed to substantially prevent lateral movement along a first vector or line, and a second opposing pair of projections 62 may be disposed to prevent lateral movement along a second vector or line perpendicular to the first vector. In this configuration, the longitudinal axis 30 of the telescopic support 100 may be normal or perpendicular to a plane defined by the first and second vectors. By substantially preventing lateral movement of the upper end 36 along multiple directions, a subset of which may be perpendicular to each other, the guide plate 60 may aid in stabilizing axial alignment of the telescopic support 100. Additionally or alternatively, by incorporating a plurality of projections 62 to interface with a side of the interior wall 12, and providing opposing, respective projections 62, twisting or torsion of the inner support 20 relative to the outer support tube 10 also may be substantially prevented.

Figure 9:
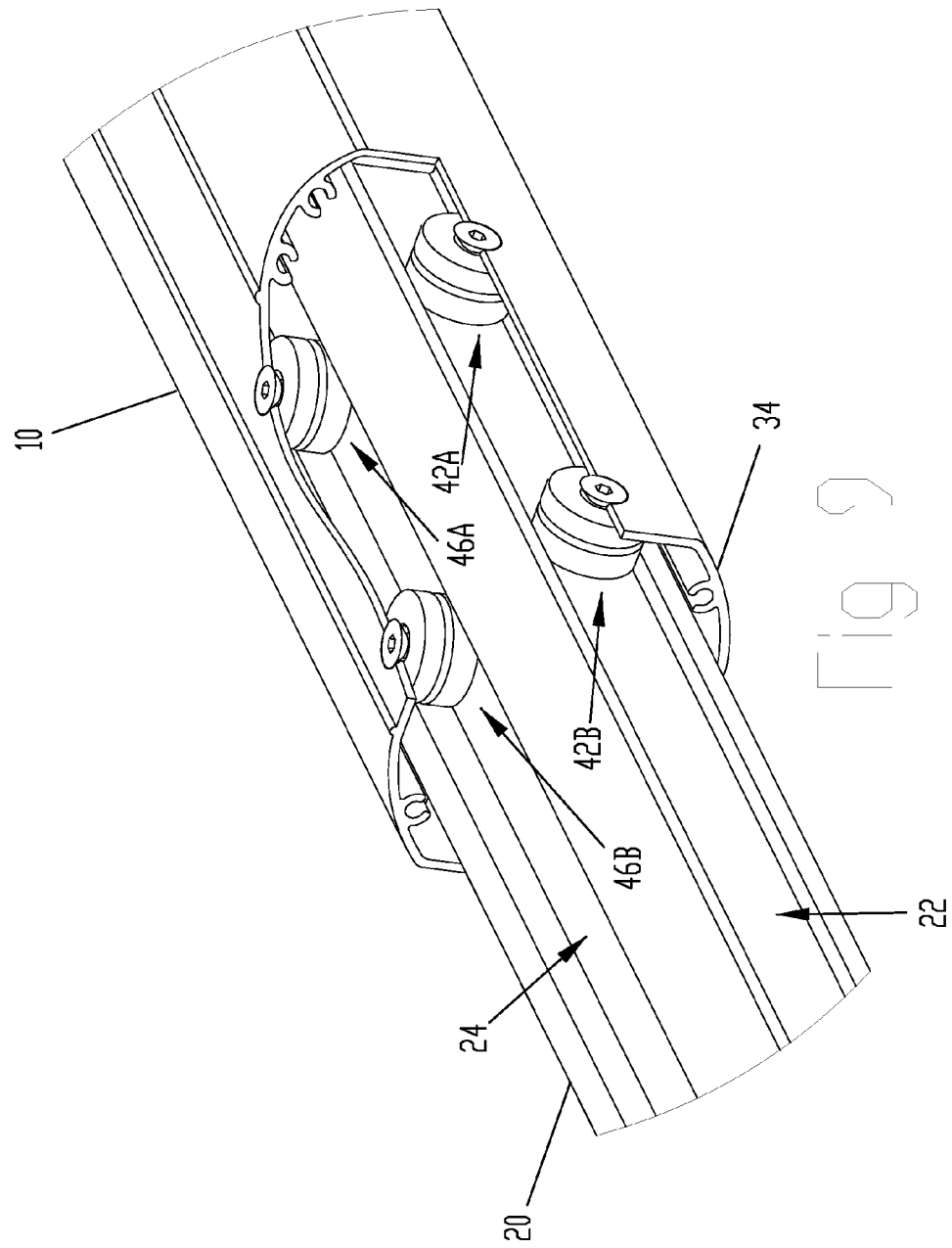
FIG. 9 is an enlarged cutaway view showing part of the telescopic support depicted in FIG. 8.

Referring now to the illustrated embodiments of FIGS. 5-9, the interaction between the bearing package 40 of the outer support tube 10, and the race sets 22, 24, 26 of the inner support 20 will now be described in further detail. In the illustrated embodiment of FIGS. 5 and 6, the bearing package 40 is depicted in an installed position within the interior space 14. The spacer plates 130A-B, 230A-B, 330A-B and roller bearings 110, 120, 210, 220, 310, 320 may be mounted to the interior wall 12 of the outer support tube 10. As shown in the illustrated embodiments of FIGS. 8 and 9, the races 22, 24, 26 of the inner support 20 may interface with the bearing sets 42A-B, 44A-B, 46A-B. There may be clearance between the bearing surface of the roller bearings 110, 120, 210, 220, 310, 320 and the races 22, 24, 26 such that one or more of the roller bearings 110, 120, 210, 220, 310, 320 may be in contact with the respective races 22, 24, 26 and one or more other roller bearings 110, 120, 210, 220, 310, 320 may not be in contact with the respective races 22, 24, 26. Further, in describing contact between the roller bearings 110, 120, 210, 220, 310, 320 and the respective races 22, 24, 26, it is noted that contact may occur at one or more points therebetween. For example, roller bearing 110, as shown in FIG. 9, may be in contact with the race surface 142. However, additionally or alternatively, the roller bearing 110 may be in contact with the opposing race surface 144. Thus, roller bearing 110 may interface with the race 24, but may or may not contact the race surfaces 142, 144 depending on the configuration and loading.

For purposes of disclosure, the telescopic support 100 is described in connection with a support for an overbed table 500, as shown in the illustrated embodiment of FIG. 11. The overbed table 500 may include a table top 520 and a base 530 with a telescopic support 510, similar to the telescopic support 100. The telescopic support 510 may provide adjustability to the table top 520 relative to the base 530 such that a user can adjust the table height of the overbed table 500.

It should be understood that the present invention is not limited to the construction depicted in FIG. 11. The telescopic support 100 according to one or more embodiments described herein may be utilized in any suitable application. It should further be understood that, for purposes of disclosure, the telescopic support 100 is described as having one or more features or configurations; however, the telescopic support 100 may be configured differently, and may be adapted to include additional features or such that one or more features herein are absent.

Referring now to FIG. 12, an alternative embodiment of the telescopic support 100 is depicted and generally designated 610. The telescopic support 600 is similar to the telescopic support 100 with several exceptions. The telescopic support 600 includes the inner support 20 of the telescopic support 100 and an outer support tube 610. The outer support tube 610 may be similar to the outer support tube 10, including, for example, a lower end 34 and a bearing package mounted to the outer support tube 610 within an interior space defined by the outer support tube 610. The bearing package of the outer support tube 610 may include a plurality of bearing sets 642, 646 arranged in a manner similar to the bearing sets 42A-B, 44A-B, 46A-B to aid in maintaining axial alignment of the telescopic support 100 and telescoping of the outer support tube 610 relative to the inner support 20.

In the illustrated embodiment of FIG. 12, each of the plurality of bearing sets 642, 646 includes a respective spacer 630, 632 along with at least two roller bearings. The intermediate bearing set 646 located between two opposing bearing sets, one depicted as bearing set 642 and the other hidden by the perspective view, may include a spacer plate 632, an upper roller bearing, and a lower roller bearing. Likewise, the bearing set 642 may include a spacer plate 630, an upper roller bearing, and a lower roller bearing. The bearing sets 642, 646 may be mounted to the interior wall of the outer support tube 610 via screws, which may fit through apertures of the outer support tube 610 and the spacer plate 630, 632, and which may engage a bushing of the roller bearings. The spacer plates 630, 632 may be generally rectangular and sized to clear the inner support 20 and the race sets 22, 24 thereof, while positioning the roller bearings of the bearing sets 642, 646 to interface with the race sets 22, 24. The spacer plates 630, 632 in the illustrate embodiment form a link between the roller bearings. However, it should be understood that the spacer plates 630, 632 may be differently configured or shaped, both, depending on the application.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A telescopic support capable of transitioning between an extended position and a retracted position, the telescopic support comprising:
   an outer support tube having an interior wall extending along a longitudinal axis of the telescopic support, the interior wall defining an interior space;
   an inner support receivable within the interior space of the outer support tube, wherein, in a fully retracted position of the telescopic support, a greater portion of the inner support is within the interior space than in a fully extended position of the telescopic support such that a longitudinal length of the telescopic support in the fully retracted position is less than the longitudinal length of the telescopic support in the fully extended position;
   at least three bearing sets respectively disposed on one of the outer support tube or the inner support, the at least three bearing sets respectively interface with a race set of the other of the outer support tube or the inner support to aid in maintaining alignment of the inner support and the outer support tube along the longitudinal axis of the telescopic support;
   wherein each of the at least three bearing sets includes at least two roller bearings spaced apart along the longitudinal axis of the telescopic support, each of the at least two roller bearings having a rotational axis substantially directed toward the longitudinal axis of the telescopic support; and
   a guide plate affixed to an end of the inner support receivable within the interior space of the outer support tube, the guide plate configured to interface with at least two opposing surfaces of the interior wall of the outer support tube to enhance stability between the inner support and the outer support tube along the longitudinal axis of the telescopic support.

2. The telescopic support of claim 1 wherein the at least three bearing sets are respectively disposed on a wall of the one of the outer support tube or the inner support near an end thereof, and wherein at least two of the bearing sets are disposed on opposite sides of the wall such that the at least two of the bearing sets form an opposing set of bearings that define a space therebetween through which the longitudinal axis traverses, wherein the opposing set of bearings are configured to aid in preventing misalignment of the inner support relative to the outer support tube in a direction perpendicular to a line extending between the opposing set of bearings;
   wherein at least one intermediate bearing set of the at least three bearing sets is disposed in the space between the opposing set of bearings, the at least one intermediate bearing set being configured to aid in preventing misalignment of the inner support relative to the outer support tube in a direction along the line extending between the opposing set of bearings.

3. The telescopic support of claim 1 further comprising at least three of the race sets, wherein the at least three bearing sets are disposed on the outer support tube, wherein the inner support includes the least three race sets, the at least three race sets being substantially parallel to the longitudinal axis of the telescopic support;
   wherein each of the at least three race sets includes a medial channel face and two race surfaces that face each other and are disposed laterally with respect to the medial channel face, the two race surfaces configured to interface with an associated bearing set from among the at least three bearing sets, the two race surfaces defining respective planes substantially parallel to the rotational axis of the roller bearings of the associated bearing set.

4. The telescopic support of claim 3 wherein the medial channel face and the two race surfaces of each of the at least three race sets are integral to the inner support such that the medial channel face and the race surfaces form part of a sidewall of the inner support.

5. The telescopic support of claim 3 wherein the outer support tube includes an upper outer end opposite a lower outer end with the interior wall extending therebetween and substantially parallel to the longitudinal axis of the telescopic support;
> wherein the inner support includes an upper inner end opposite a lower inner end with a sidewall extending therebetween and substantially parallel to the longitudinal axis of the telescopic support;
> wherein, in the fully retracted position, the lower outer end of the outer support tube is near the lower inner end of the inner support, and wherein, in the fully retracted position, the lower outer end of the outer support tube is closer to the upper inner end than the lower inner end.

6. The telescopic support of claim 1 wherein the inner support is a tube defining an inner interior space.

7. The telescopic support of claim 1 wherein the telescopic support is configured to support an overbed table, wherein the telescopic support provides adjustability to a table height of the overbed table.

8. The telescopic support of claim 7 wherein the telescopic support includes a gas cylinder that assists in adjusting and maintaining the table height of the overbed table.

9. An overbed table having an adjustable height, the overbed table comprising;
a base adapted to support the overbed table on a floor;
a table top having a top table surface and a bottom table surface, the bottom table surface opposite the top table surface, the bottom table surface of the table having a first end and a second end opposite the first end, wherein the first and second ends define a table axis of the overbed table; and
a telescopic support coupled to the base and the bottom table surface of the table top, the telescopic support having an outer support tube with an upper end affixed to the table top, the telescopic support having an inner support with a lower end affixed to the base, the inner support being receivable within an interior space of the outer support tube such that the telescopic support is capable of extending and retracting, wherein the telescopic support is coupled to the bottom table surface proximate the first end such that the overbed table is a cantilevered table about the table axis;
wherein the telescopic support includes only three bearing sets respectively disposed on the outer support tube, the three bearing sets respectively interface with three race sets of the inner support to aid in maintaining alignment of the inner support and the outer support tube along a longitudinal axis of the telescopic support;
wherein each of the three bearing sets includes at least two roller bearings spaced apart along the longitudinal axis of the telescopic support, each of the at least two roller bearings having a rotational axis substantially directed toward the longitudinal axis of the telescopic support; and
wherein the three bearing sets include a first bearing set, a second bearing set and a third bearing set, and wherein each of the first and second bearing sets is disposed with the rotational axes of the at least two roller bearings being substantially transversely aligned with the table axis, and the third bearing set is disposed with the rotational axis of the at least two roller bearings being substantially aligned in parallel with the table axis.

10. The overbed table of claim 9 wherein the rotational axis of each of the roller bearings intersects at least two points of the inner support and intersects a diameter line of the inner support.

11. The overbed table of claim 9 wherein the three race sets of the inner support are parallel to the longitudinal axis of the telescopic support, and wherein each of the three race sets includes a medial channel face and two laterally opposed race surfaces, wherein the medial channel face faces an interior wall of the outer support tube, and wherein the two laterally opposing race surfaces substantially face each other.

12. The overbed table of claim 11 wherein a bearing surface of each of the roller bearings interfaces with both of the two laterally opposed race surfaces, and wherein the bearing surface of each of the roller bearings is capable of contacting at least one of the two laterally opposed race surfaces.

13. The overbed table of claim 9 wherein extending the inner support out from the interior space raises the table height of the table top by increasing the distance between the base and the table top.

14. The overbed table of claim 9 wherein the inner support is a tube, and wherein the overbed table includes a gas cylinder disposed within an interior of the telescopic support and coupled to an upper end of the telescopic support and a lower end of the telescopic support, the gas cylinder capable of maintaining a distance between the upper and lower ends of the telescopic support, the gas cylinder having an actuator that, in response to being actuated, enables the gas cylinder to extend and retract such that the upper end moves relative to the lower end of the telescopic support.

15. The overbed table of claim 9 further comprising a guide plate affixed to an upper end of the inner support, the guide plate having a plurality of projections adapted to interface with an interior wall of the outer support tube, the plurality of projections includes first and second pairs of opposing projections configured to interface with opposing surfaces of the interior wall of the outer support tube, the first pair of opposing projections substantially prevent lateral movement of the upper end of the inner support relative to the interior wall along a first line, and the second pair of opposing projections substantially prevent lateral movement of the upper end of the inner support relative to the interior wall along a second line, the first line and the second line being perpendicular to each other and defining a plane normal to the longitudinal axis of the telescopic support.

16. The overbed table of claim 15 further comprising a finger guard affixed to a lower end of the outer support tube, the finger guard having an interior aperture configured to receive the inner support, the interior aperture being sized to provide clearance from an exterior wall of the inner support that aids in limiting entry of at least one of fingers and debris.

17. An inner member of a telescopic support, the telescopic support having an outer support tube and a longitudinal axis, the inner member comprising:
a first end receivable within an interior space of the outer support tube;
a second end moveable relative to the outer support tube;
an exterior wall between the first end and the second end, the exterior wall being parallel to the longitudinal axis of the telescopic support;
at least three race sets parallel to the longitudinal axis of the telescopic support, each of the at least three race sets including a medial channel face and two laterally opposed race surfaces, wherein the medial channel face is configured to face an interior wall of the outer support tube, and wherein the two laterally opposed race surfaces substantially face each other; and
a guide plate affixed to the first end of the inner support receivable within the interior space of the outer support tube, the guide plate configured to interface with at least two opposing surfaces of an interior wall of the outer support tube to enhance stability between the inner support and the outer support tube along a longitudinal axis shared by the inner member and the outer support tube.

18. The inner support member of claim 17 wherein at least one of the two laterally opposed race surfaces is capable of contacting a bearing surface of a bearing disposed on the outer support tube.

19. The inner support member of claim 17 wherein the medial channel face and the two race surfaces of each of the at least three race sets are integral to the inner support such that races surfaces and the medial channel face form part of the exterior wall.

20. The inner support member of claim 17 wherein the two laterally opposed race surfaces are machined to provide a finish for interfacing with a bearing surface.

* * * * *